(12) United States Patent  (10) Patent No.: US 8,880,622 B2
Chakra et al.  (45) Date of Patent: Nov. 4, 2014

(54) MESSAGE THREAD MANAGEMENT USING DYNAMIC POINTERS

(75) Inventors: Al Chakra, Research Triangle Park, NC (US); Feng-Wei Chen, Research Triangle Park, NC (US); Heng Chu, Chapel Hill, NC (US); Chad L. Smith, Research Triangle Park, NC (US)

(73) Assignee: International Business Machines Corporation, Armonk, NY (US)

( * ) Notice: Subject to any disclaimer, the term of this patent is extended or adjusted under 35 U.S.C. 154(b) by 792 days.

(21) Appl. No.: 12/828,265

(22) Filed: Jun. 30, 2010

(65) Prior Publication Data

US 2012/0005280 A1  Jan. 5, 2012

(51) Int. Cl.
*G06F 15/16* (2006.01)
*G06Q 10/10* (2012.01)
*G06F 17/30* (2006.01)

(52) U.S. Cl.
CPC ........ *G06F 17/30707* (2013.01); *G06Q 10/107* (2013.01)
USPC .......................................................... 709/206

(58) Field of Classification Search
CPC ................................ H04L 51/16; H04L 51/22
USPC .......................................................... 709/206
See application file for complete search history.

(56) References Cited

U.S. PATENT DOCUMENTS

| 7,680,843 | B1 | 3/2010 | Panchbudhe | |
|---|---|---|---|---|
| 2003/0163537 | A1* | 8/2003 | Rohall et al. | 709/206 |
| 2004/0167964 | A1* | 8/2004 | Rounthwaite et al. | 709/206 |
| 2004/0260756 | A1 | 12/2004 | Forstall et al. | |
| 2005/0044081 | A1* | 2/2005 | Ferguson et al. | 707/10 |
| 2006/0010213 | A1 | 1/2006 | Mehta | |
| 2006/0178134 | A1* | 8/2006 | Adams et al. | 455/413 |
| 2006/0248151 | A1* | 11/2006 | Belakovskiy et al. | 709/206 |
| 2008/0168149 | A1* | 7/2008 | Daniell | 709/206 |
| 2008/0301250 | A1* | 12/2008 | Hardy et al. | 709/207 |
| 2009/0013046 | A1* | 1/2009 | Lee et al. | 709/206 |
| 2009/0276732 | A1 | 11/2009 | Dervan | |

* cited by examiner

*Primary Examiner* — Hee Soo Kim
(74) *Attorney, Agent, or Firm* — Steven M. Greenberg, Esq.; CRGO Law

(57) ABSTRACT

Embodiments of the present invention provide a method, system and computer program product for message thread management using dynamic pointers. In an embodiment of the invention, a method for message thread management using dynamic pointers is provided. The method includes selecting a message thread in a message inbox of a messaging client, comparing characteristics of the message thread to a pre-established set of criteria, and removing the selected message thread to remote storage, generating a message thread pointer to the selected message thread and inserting the message thread pointer into the message inbox in place of the selected message thread in response to the characteristics of the message thread satisfying the criteria.

10 Claims, 1 Drawing Sheet

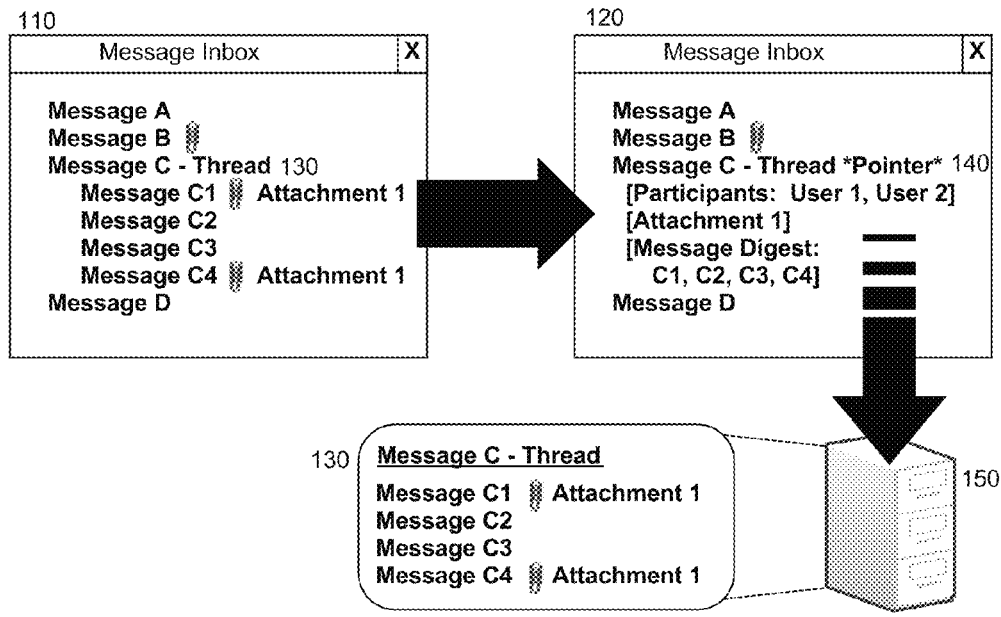
FIG. 1
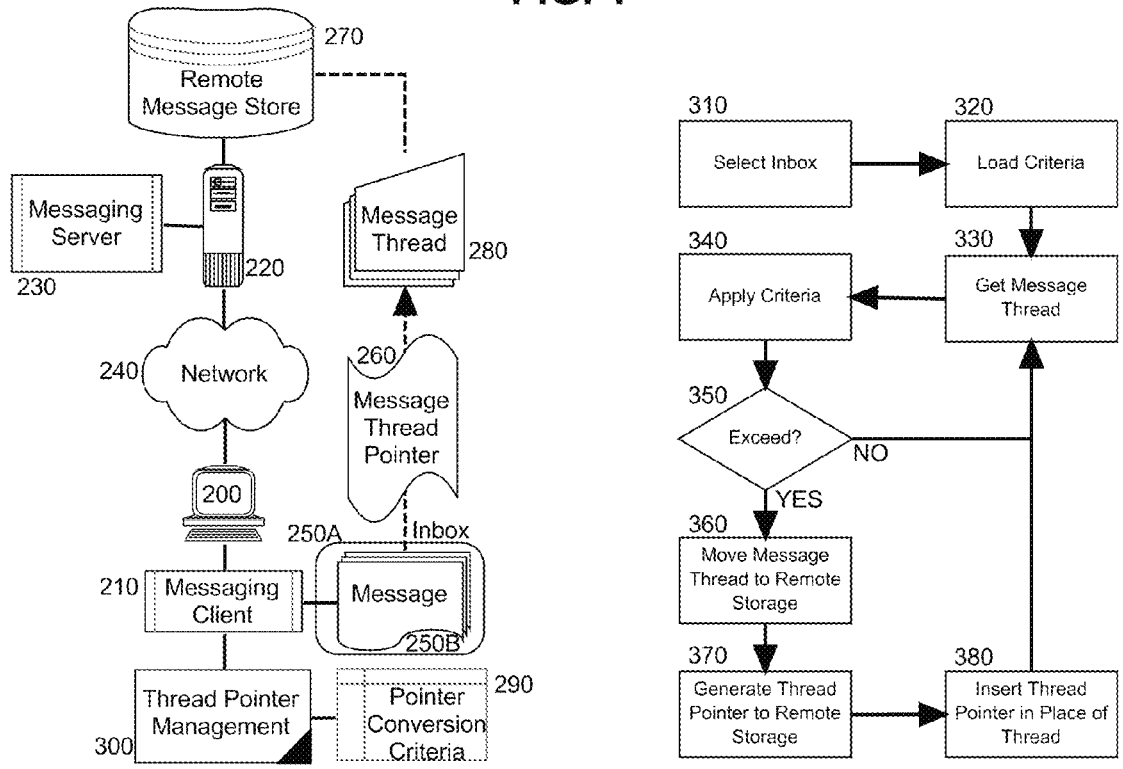
FIG. 2
FIG. 3

MESSAGE THREAD MANAGEMENT USING DYNAMIC POINTERS

BACKGROUND OF THE INVENTION

1. Field of the Invention

The present invention relates to the field of inbox management for messaging systems and more particularly to threaded messages views of an inbox.

2. Description of the Related Art

Electronic messaging represents the single most useful task accomplished over wide-scale computer communications networks. Some argue that in the absence of electronic messaging, the Internet would have amounted to little more than a science experiment. Today, electronic messaging seems to have replaced the ubiquitous telephone and fax machine for the most routine of interpersonal communications. As such, a variety of electronic messaging systems have arisen which range from real-time instant messaging systems and wireless text pagers to asynchronous electronic mail systems.

Electronic mail, a form of electronic messaging referred to in the art as e-mail, has proven to be the most widely used computing application globally. Though e-mail has been a commercial staple for several decades, due to the explosive popularity and global connectivity of the Internet, e-mail has become the preferred mode of communications, regardless of the geographic separation of communicating parties. Today, more e-mails are processed in a single hour than phone calls. Clearly, e-mail as a mode of communications has been postured to replace all other modes of communications, save for voice telephony.

An inbox generally provides for the receipt, classification, storage, and handling of incoming messages. As messages are received, each received message can be viewed and handled according to the preferences of the end user. In most cases, a message can be deleted, stored in a folder, forwarded to a different person or persons, or replied to the sender and optionally any other recipients of the message. Where a single message has been replied to or forwarded repeatedly by and to different parties to the message, a message thread is generated wherein each transmitted message is viewed as a member of the thread. To that end, a message thread can be a messaging analog of a conversation.

Message threads when limited in the number of messages can be extraordinarily helpful in permitting different readers to gain a quick understanding of the flow of a virtual conversation. However, over time, the volume of messages in a message thread can become substantial and older messages in the message thread can become stale. Further, to the extent that later postings to the message thread include "history" of other messages in the thread, content in the message thread can be stored in duplicate, triplicate and so forth. Specifically, each message in the message thread represents a single response to a prior message in the thread. However, each message in the message thread can include under certain circumstances that result most often from the directive "Reply with History" the content of other messages in the message thread.

Thus, significant computing resources can be consumed in storing message content repetitively and unnecessarily, including disk space, processor time in loading the stored content of the message thread into dynamic memory, and of course the dynamic memory itself. The problem can be compounded when messages in the message thread include attachments of some size. The duplication of messages with attachments in a message thread can result in exponentially greater consumption of computing resources.

BRIEF SUMMARY OF THE INVENTION

Embodiments of the present invention address deficiencies of the art in respect to threaded messages in a messaging system and provide a novel and non-obvious method, system and computer program product for message thread management using dynamic pointers. In an embodiment of the invention, a method for message thread management using dynamic pointers is provided. The method includes selecting a message thread in a message inbox of a messaging client, comparing characteristics of the message thread to a pre-established set of criteria, and removing the selected message thread to remote storage, generating a message thread pointer to the selected message thread and inserting the message thread pointer into the message inbox in place of the selected message thread in response to the characteristics of the message thread satisfying the criteria.

In another embodiment of the invention, a messaging data processing system is provided. The system includes a computer with at least one processor and memory and a messaging client executing in the memory of the computer and comprising a message inbox of messages and message threads of messages. The system further includes a thread pointer management module coupled to the messaging client. The module includes program code enabled to select a message thread in the message inbox, to compare characteristics of the message thread to a pre-established set of criteria, and to remove the selected message thread to remote storage coupled to messaging client over a computer communications network, to generate a message thread pointer to the selected message thread and to insert the message thread pointer into the message inbox in place of the selected message thread in response to the characteristics of the message thread satisfying the criteria.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a pictorial illustration of a process for message thread management using dynamic pointers;

FIG. 2 is a schematic illustration of a messaging data processing system configured for message thread management using dynamic pointers; and, FIG. 3 is a flow chart illustrating a process for message thread management using dynamic pointers.

DETAILED DESCRIPTION OF THE INVENTION

Embodiments of the invention provide for message thread management using dynamic pointers. In accordance with an embodiment of the invention, a message thread of different messages can be monitored in a message inbox such as an e-mail inbox. When the message thread meets a threshold criteria such as the size of the thread, the message thread can be replaced in the message inbox with a pointer to a remotely stored duplicate of the message thread. The pointer can include metadata regarding the message thread including an identification of the participants to the thread, a digest summary of the messages of the message thread, and a single copy of each attachment to messages in the thread. Duplicate forms of the same attachment can be discarded. In this way, the computing resources consumed by the duplication of data and attachments in a message thread can be reduced intelligently according to threshold characteristics of the message thread.

In further illustration, FIG. 1 pictorially depicts a process for message thread management using dynamic pointers. As shown in FIG. 1, a message inbox 110 of messages can include a message thread 130. The message thread 130 can include a series of interrelated messages beginning with a root message and continuing with one or more messages in response either to the root message, or a preceding message responsive to either another preceding message or the root message and so forth. Individual ones of the messages in the thread 130 can include attachments. Conversion criteria, such as the size of the thread 130 the number of messages in the thread 130 or the number of users posting messages to the thread 130 can be compared to the thread 130.

To the extent that the criteria is met or exceed by a threshold value, a thread pointer 140 can be generated for the message thread 130 and can include metadata regarding the thread such as a digest of the messages in the message thread 130, a listing of users posting messages to the message thread 130, and a single copy of the attachments present in the message thread 130 with any duplicate copies of the attachments omitted. The message thread 130 can be moved to remote storage 150 and an activatable reference to message thread 130 as stored in remote storage 150 can be placed in the thread pointer 140 in the inbox 110. In this way, the processing resources of the computer hosting the inbox 110 can be consumed reservedly by removing the consumptive message thread 130 to the remote storage 150 leaving in the inbox 110 only a thread pointer 140 to the message thread 130.

The process described in connection with FIG. 1 can be implemented in a message data processing system such as that shown in FIG. 2. Specifically, FIG. 2 is a schematic illustration of a messaging data processing system configured for message thread management using dynamic pointers. The system can include a computer 200 with at least one processor and memory supporting the execution of messaging client 210 such as an e-mail client. The messaging client 210 can be communicatively coupled to messaging server 230 executing in memory of remote host 220 over computer communications network so as to provide message transmission and reception capability for the messaging client 210.

Messaging client 210 can be configured to manage messages 250B in message inbox 250A. The messages 250B in the message inbox 250A can include from time to time one or more message threads 280. Thread point management module 300 coupled to the messaging client 210 and executing in the memory of the computer 200 can include program code that when executed by the computer 200 can compare pointer conversion criteria 290 to individual ones of the message threads 280 to determine whether or not to replace the individual ones of the message threads 280 with a corresponding message pointer 260. If so, the program code of the module 300 can remove the message threads 280 referenced by corresponding message thread pointers 260 to remote message store 270 from which the removed message threads 280 can be accessed remotely from the messaging client 280.

As noted, the determination of whether or not to replace a message thread 280 with a message thread pointer 260 in the inbox 250A can depend upon whether or not the message thread 280 satisfies the pointer conversion criteria 290. The pointer conversion criteria 290 can include by way of example:

A. A physical size of the message thread, typically expressed in byte units

B. A number of users contributing messages to the message thread

C. A size of any number of attachments in messages in the message thread.

The message thread pointer 260 generally includes metadata pertaining to the message thread 280, such as a number of messages and number of users contributing the messages to the message thread 280. The metadata also can provide a digest of the messages in the message thread, as well as a single copy of each of the attachments to the messages of the message thread. Of note, the metadata can be live and periodically updated to reflect changes to a remotely stored message thread such as a change in a number of messages added to the message thread, or a number of users contributing to the message thread, the digest itself, the selection of attachments and a size of the message thread.

In yet further illustration of the operation of the thread pointer management logic 300, FIG. 3 is a flow chart illustrating a process for message thread management using dynamic pointers. Beginning in block 310, an inbox can be selected for processing and in block 320 pointer conversion criteria can be loaded. In block 330, a message thread in the inbox can be selected for processing and in block 340 the criteria can be applied to the selected message thread. In decision block 350 if the criteria are met or exceeded by a threshold value, then in block 360 the message thread can be removed to remote storage and in block 370 a message thread pointer can be generated for the message thread in the remote storage. Finally, in block 380 the message thread pointer can be placed into the inbox in place of the message thread.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Further, with specific reference to a computer readable storage medium, it is to be understood that a storage medium excludes transitory media such as transitory signals and other propagation media.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A messaging data processing system comprising:
    a computer with at least one processor and memory;
    a messaging client executing in the memory of the computer and comprising a message inbox of messages and message threads of messages; and,
    a thread pointer management module coupled to the messaging client, the module comprising program code enabled to select a message thread in the message inbox, the message thread comprising a series of interrelated messages beginning with a root message and continuing with one or more additional messages, to compare characteristics of the message thread to a pre-established set of criteria, and to remove the selected message thread to remote storage coupled to messaging client over a computer communications network, to generate a message thread pointer to the selected message thread and to insert the message thread pointer into the message inbox in place of the selected message thread in response to the characteristics of the message thread satisfying the criteria.

2. A computer program product for message thread management using dynamic pointers, the computer program product comprising:

a computer readable storage medium having computer readable program code embodied therewith, the computer readable program code comprising:

computer readable program code for selecting a message thread in a message inbox of a messaging client executing in memory by at least one processor of a computer, the message thread comprising a series of interrelated messages beginning with a root message and continuing with one or more additional messages;

computer readable program code for comparing characteristics of the message thread to a pre-established set of criteria; and, computer readable program code for removing the selected message thread to remote storage, generating a message thread pointer to the selected message thread and inserting the message thread pointer into the message inbox in place of the selected message thread in response to the characteristics of the message thread satisfying the criteria.

3. The computer program product of claim 2, wherein the message thread is an e-mail.

4. The computer program product of claim 2, further comprising computer readable program code for including in the message thread pointer a single copy of all attachments to the series of interrelated messages of the message thread while removing duplicates of identical attachments of the series of interrelated messages from the inbox.

5. The computer program product of claim 2, wherein the criteria comprises a size of the message thread.

6. The computer program product of claim 2, wherein the criteria comprises a number of interrelated messages of the series of interrelated messages in the message thread.

7. The computer program product of claim 2, wherein the criteria comprises a number of users contributing to the series of interrelated messages to the message thread.

8. The computer program product of claim 2, wherein the criteria comprises a size of attachments to the series of interrelated messages in the message thread.

9. The computer program product of claim 2, wherein the message thread pointer comprises metadata describing the message thread, and an activatable reference to the message thread in the remote storage for retrieving the message thread upon activation.

10. The computer program product of claim 9, wherein the metadata comprises a message digest of the series of interrelated messages of the message thread, and a listing of contributors of the series of interrelated messages to the message thread.

* * * * *